July 5, 1949.  T. W. STEPHENSON ET AL  2,474,992
REAR FENDER CONSTRUCTION
Filed Feb. 7, 1946  3 Sheets-Sheet 1

T. W. Stephenson
C. W. Bugbee
INVENTORS

July 5, 1949.　　T. W. STEPHENSON ET AL　　2,474,992
REAR FENDER CONSTRUCTION
Filed Feb. 7, 1946　　3 Sheets-Sheet 2

T. W. Stephenson
C. W. Bugbee
INVENTORS
BY (signatures)
Attorneys.

UNITED STATES PATENT OFFICE 2,474,992

REAR FENDER CONSTRUCTION

Thomas W. Stephenson, Detroit, and Charles W. Bugbee, Royal Oak, Mich., assignors to Ford Motor Company, Dearborn, Mich., a corporation of Delaware Application February 7, 1946, Serial No. 646,053

7 Claims. (Cl. 296—28)

This invention relates to the construction of bodies for motor vehicles; and, more particularly, to a quarter panel, rear fender and stone guard assembly for said vehicles.

In recent years, the fenders of motor vehicles have become less and less distinct from the associated body panels proper due to the streamlined effects which the designers have sought to obtain; and the present trend is toward a further integration of these elements with the general lines of the body. However, it is still desirable to maintain identity of structure between the main body panel and the associated fender—partly for reasons of manufacture and partly to permit easier repair or replacement of the fender element. It is common experience that the fenders are the part of the car most frequently damaged by collision and are prone to acquire large numbers of dents or disfiguring blemishes even with the most careful use. While it is quite practicable from a manufacturing standpoint to extend the side quarter panel of the body down and have it serve as the outer covering of the wheel enclosure—that is, serving as a fender—when the lower portion of such a panel is damaged excessively, it is very difficult to repair, and restoration of its appearance may involve the welding in of large patches with subsequent soldering and buffing. This is very expensive and in extreme cases may not be practicable. It is therefore desirable to have at least a lower part of the fender removable so that in the case of minor disfigurements, it may be worked upon easily and when the damage is too great for repair, the entire unit may be readily replaced at a minimum expenditure.

As far as manufacturing is concerned, the rear quarter panel of the body is so large, both longitudinally and vertically, that considerable intermediate support is required; and as the metal is of rather light gage, some means of internal protection is required adjacent the wheel to prevent the disfigurement of the panel by road material thrown up by the wheel. However, it is essential that the construction adopted be of the greatest practicable simplicity both to reduce the weight of the body and to permit its ready fabrication and assembly. It is further desirable that the amount of draw in the individually stamped components be kept to a minimum, although it is essential to avoid the boxy appearance which results when large flat panels are used. It is further desirable to provide adequate stiffening means for the panels; and this is particularly true when, as in the present instance, the lower edge of the component is largely unsupported. Despite the exercise of the greatest care, dimensional differences in stamped parts are unavoidable and these become increasingly troublesome as the size of the component increases. In order to permit the successful assembly of parts having such variations in dimension, provision must be made for considerable leeway in fitting them together without affecting adversely the appearance of the vehicle or permitting such excessive clearances as will allow leakage, or hold moisture, causing the rusting of the components.

In line with the present body practice, it is desirable to avoid emphasis on the joints between the fender and the body components so that the use of antisqueak material with an external bead of the type previously used should be avoided, as accentuating this division between the components. It is also essential that care be taken to avoid spaces between adjacent components which will retain moisture since, despite the best rustproofing practice, the metal will deteriorate—particularly in winter city driving when salt or calcium chloride is applied to streets to control the snow and ice.

The advantage of the present construction is that it permits the use of a relatively simple fender component which may be readily removed for repair or replacement, and yet one which blends well with the remainder of the vehicle. Another advantage is that a fender so designed may project the general line of the vehicle without excessive draw and yet will be adequately strong and fully protected against deformation by material thrown up by the wheels. Another advantage is that the construction permits the use of single side fender panels reaching from the rear edge of the vehicle doors and having associated with them a stone guard extending around the rear of the vehicle; and yet full provision is made for the variations in dimensions which are inescapable in this type of work. A further advantage is that the construction employs an antisqueak material, where necessary, disposed inwardly of the outer surface of the vehicle so that it is invisible and the joint between the fender and body components is visible as a design rather than as a structural line. Another advantage is the ease with which the fender component may be attached during assembly or detached later when required, due to the accessibility of the fastening means which, nevertheless, are fully concealed.

Other advantages will be apparent in consideration of the structure as explained in detail in this specification, claimed in the following claims, and shown in the accompanying drawing, in which:

Figure 1:
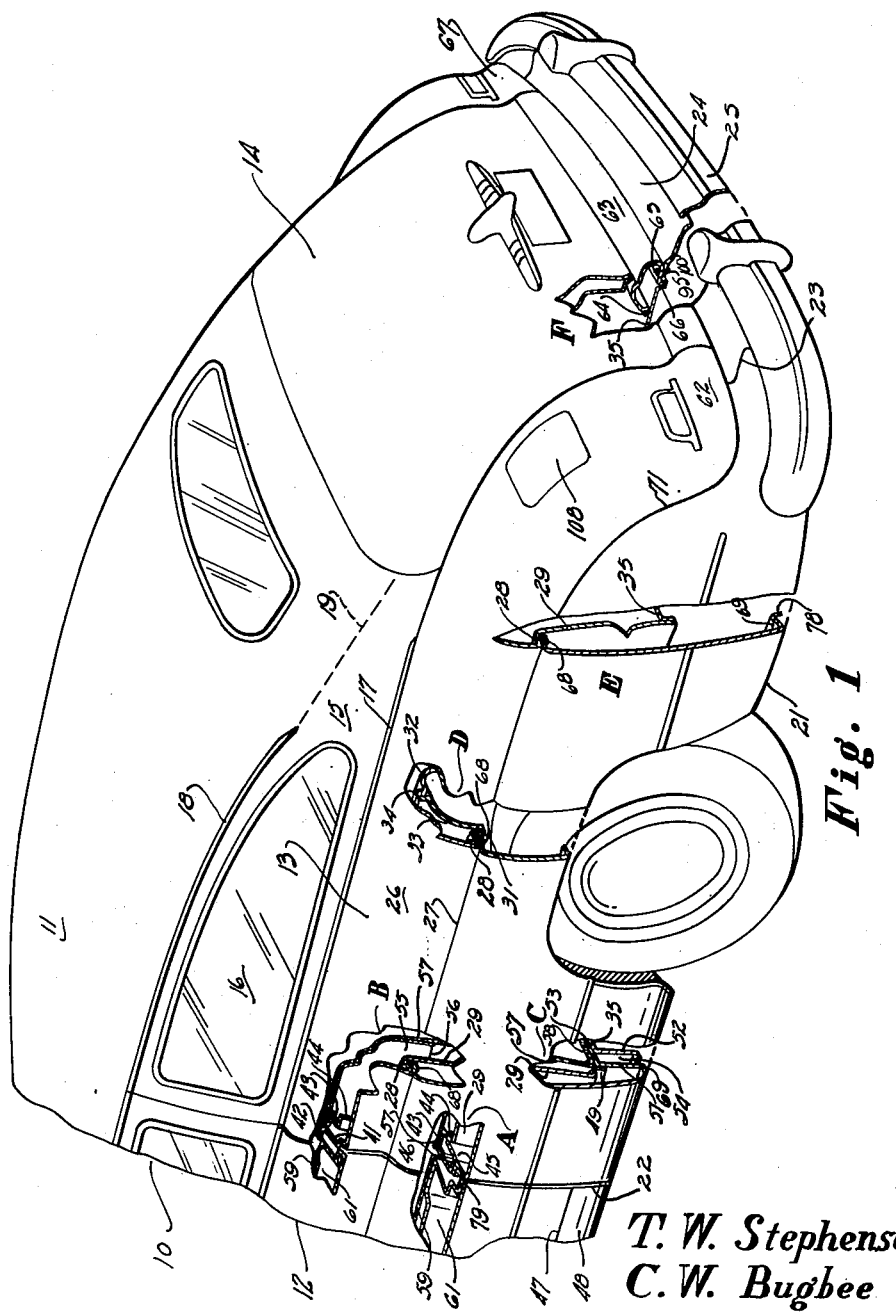
Figure 1 is a perspective view of the rear quarter of a motor vehicle of the Tudor type employing the present construction and showing several sections thereon, designated as A, B, C, D, E, and F.

Referring first to Figure 1, the rear half of the vehicle 10 of the Tudor type is shown having a roof 11, a door 12, a quarter panel 13 and trunk or rear deck door 14 hinged at its upper edge to the rear edge of the roof 11. In addition, there is a quarter window panel 15 supporting the quarter window 16 and extending between the belt moulding 17 at its juncture with the quarter panel 13 to the drip moulding 18; and at its rear end it is joined to the roof 11 by the solder joint indicated by the dotted line 19. The vehicle fender 21 extends rearwardly from the rear edge 22 of the door 12 and curves around the rear corner of the quarter panel 13 to join at 23 with a stone guard 24 which reaches across the rear of the body inwardly of the rear bumper 25.

Figure 2:
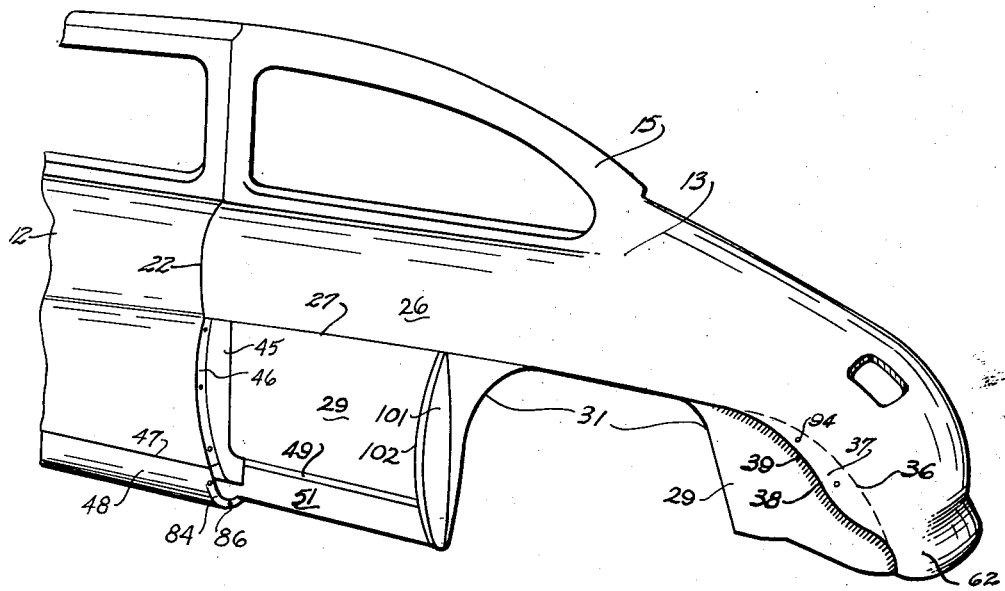
Figure 2 is a perspective view of the quarter panel and a part of the associated door with the fender component removed.

As best shown in Figure 2, and in Sections A, B, C, D, and E, of Figure 1, the quarter panel 13 has a normally exposed upper portion 26 running rearwardly from the rear edge 22 of the door 12 and curving downwardly at its rear end following the desired body line. The lower edge of the exposed portion 26 is indicated by the line 27 and on that line, the quarter panel 13 is formed with an inwardly extending flange 28 which then merges into the vertical concealed lower part 29 of the quarter panel 13. In Figure 2, and in Section D of Figure 1, the center part of the lower panel 29 is cut away at 31 to form a wheel access opening and a wheelhousing formed of curved inner and outer sections 32 and 33 welded together at 34—the lower edge of the outer section 33 being curved to conform more or less to the access opening 31 and abutting the panel 29 adjacent the opening and welded to it. The lower edge of the inner section 32 of the wheelhousing extends downwardly a substantially greater distance until it meets the floor 35 of Figure 6, and is there welded to it. The flange 28 extends substantially throughout the straight portion of the line 27 which is about as far as Section E of Figure 1, after which the line curves downwardly and around the rear of the panel 13, as indicated by the dotted line 36, on Figure 2. Through this area, the vertical plane of the panel 26 is continued as at 37 between the dotted line 36 and the break line 38 which is spaced a substantial distance from the line 37. The transition between the break line 38 and the inset lower panel 29 is effected through a sloping section 39 as indicated by the shading. The lower edge of the lower panel 29 is secured to the floor panel 35 (Section E, Figure 1) and this floor panel also supports the wheelhousing and extends rearwardly (Section F, Figure 1) throughout the rear trunk and forwardly (Section C, Figure 1) through the passenger space of the vehicle.

At the forward edge, the upper panel 26 of the quarter panel 13 is bent inwardly as at 41 (Section B, Figure 1) and has an inner flange 42 secured to one leg of the Z member 43. The other leg 44 of the member 43, while more or less parallel with the panel 26, is spaced from it and serves as a stiffening member for the edge construction. Since it is not attached to the panel 26, there is no disfigurement of that panel through its visible extent which would otherwise be occasioned by welding or other means of attachment. However, when the lower panel 29 is reached (Section A, Figure 1), the panel 29 is directly attached to the leg 44 of the Z member 43 and a pillar construction is formed through a channel 45 having the outer portion of its flanges welded to spaced sections of the Z member 43. The web 46 of the channel extends vertically from the line 27 as far as the upper line 47 of the rocker panel 48. The lower panel 29 terminates in an inwardly spaced depending flange 49 (Section C, Figure 1) which abuts against flange 51 along the side edge of the floor panel 35. The flange 51 further co-operates with a spaced flange 52 on the floor reinforcing panel 53 which, in effect, provides a box section sill 54 which runs forwardly from the wheel enclosure continuously to the front pillar of the vehicle as described in the copending application Serial No. 608,488 for Body cowl construction.

So far as interior trim is concerned, an inner metal panel 55 is secured to the inner leg of the Z member 43 and extends downwardly from about the level of the belt molding 17 to a lower edge 56 (Section B, Figure 2). This panel supports the window-regulating apparatus for the quarter window 16 and carries the interior trim panel 57—usually of fiberboard covered by upholstery or leather—which extends from the garnish molding of the window down to the floor (Section C, Figure 1) where it joins with the carpet or mat 58 on the floor 35 covering the interior of the vehicle. The trim panel 57 extends up to the edge of the door opening (Sections A and B, Figure 1) and the door 12 carries a similar trim panel 59 secured—at least adjacent its edges—to the inner panel 61 of the door.

As noted before, and best shown in Figures 1 and 6, the rear lower end of the quarter panel 13 curves around as at 62 terminating at the edge of the opening for the trunk door 14. This line is continued and a sill for the trunk door is provided by the transverse member 63 which has an inner flange 64 welded to the floor member 35 and an outer return flange 65 welded to a depending flange 66 along the rear edge of the floor 35. The transverse rear member 63 extends across the rear of the vehicle and joins with the quarter panel 67 on the opposite side.

Figure 3:
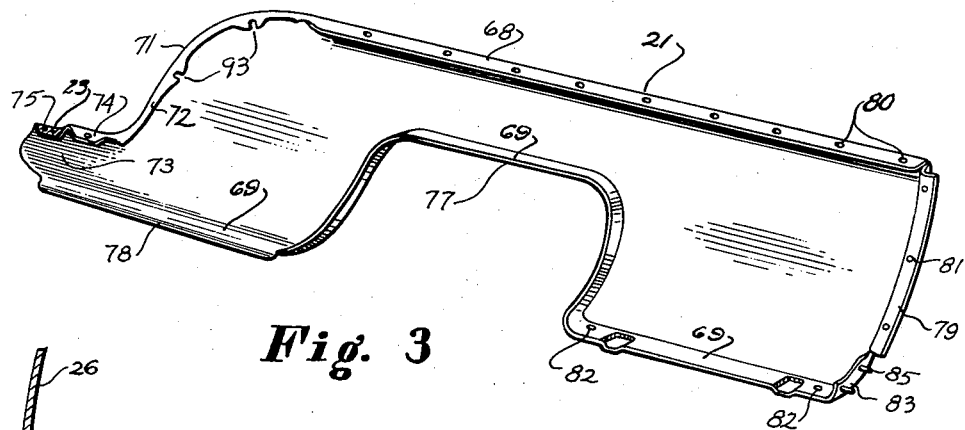
Figure 3 is a perspective view of the interior of the fender component as removed from the structure of Figure 2.

Attention is now directed to Sections A, B, C, D and E of Figure 1, and to Figure 3 showing the conformation and arrangement of the fender proper. As best seen in Figure 3, the fender 21 is substantially an elongated rectangle having inwardly flanged upper and lower edges 68 and 69, and terminating rearwardly in a downwardly curved section 71—more or less conforming to the curvature of the dotted line 36 in Figure 2 and throughout which the edge flange 72 is bent over to a position of spaced parallelism with the main panel of the fender. In addition, at the extreme rear, there is an inwardly curved portion 73 which has a first flange 74 adapted to underlie the lower surface of the rear curve 62 of the quarter panel 13 and a second flange 75 normal to the adjacent plane of the fender and extending along the joint line 23 for abutting engagement with a similar flange on the end of stone guard 24. The lower edge of the fender has an inwardly extending flange 69 along its entire extent included around the wheel access opening 77, but this is modified rearwardly of that opening by a depending flange 78 (Section E, Figure 1) which further stiffens the unsupported skirt of the fender but which is spaced sufficiently inwardly of the outer surface of the fender so as to be practically invisible. The forward edge of the fender, for the greater part of its height, is formed with an inwardly spaced parallel flange 79 which (Section A, Figure 1) is adapted to abut against the channel 46 and be secured thereon by countersunk-head screws extending through the co-operating holes 81 in the flange 79 and the channel. Similarly, the flange 67 between the forward edge and the wheel access opening abuts against the lower surface of the sill member 54 and is secured thereon by screws or bolts passing through the holes 82 and line with suitable fastening means on the sill. The remainder of the forward edge of the fender 21 is formed with a normal flange 83 aligning with a similar flange 84 at the rear end of the rocker panel 48 (Figure 2). Relative alignment between these two components may be maintained as by pins 85 on the flange 83 which are received in correspondingly spaced openings 86 on the flange 84.

Figures 4, 5:
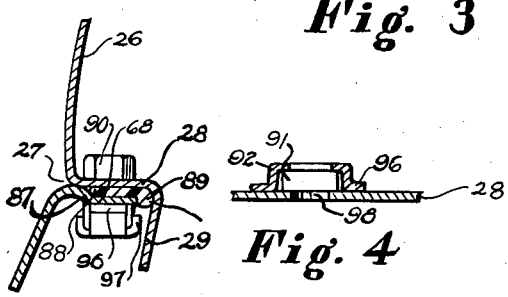
Figures 4 and 5 are enlarged longitudinal and transverse sectional views of the fastening means employing cage nuts as arranged on the quarter panel of the body or the flange of the fender, respectively.

The upper flanged edge 68 (as shown in Sections B and D, Figure 1 and in Figure 5) is seated beneath the inwardly extending flange 28 of the quarter panel and the rear edge flange 72 abuts against the surface 37 (Figure 2). It is thus apparent that considerable latitude of longitudinal movement is permitted without resultant transverse displacement of the fender so that the forward edge of the fender can be precisely aligned as may be required with the rear edge of the door and the corresponding forward exposed edge of the quarter panel. The fender, as shown in Figures 4 and 5, is removably secured in place on the quarter panel by bolts engaging cage nuts. Forwardly of the wheel access opening, since the lower edge of the fender abuts against the sill 54, the cage nut is usually attached to the lower surface of the fender flange 68 and the bolt is introduced from above through the flange 28 before the internal trim panel is applied. However, in the vicinity of the wheel access opening, it may be desirable to mount the cage nuts on the upper surface of the flange 28 and introduce the bolts from beneath through the fender flange 68 because of limited access between the wheel housing and the inner surface of the quarter panel. The precise arrangement, of course, depends upon the room available, but it will be apparent that suitable provision may be made throughout the extent of the flange for attachment of the fender to the quarter panel; and that while the attaching means are completely concealed, they are readily available for initial installation or subsequent removal.

As shown in Figure 5, the flange 68 along the upper edge of the fender 21 does not extend straight inwardly, but rather drops down slightly as at 87 so that when the fender and quarter panel are drawn up tightly, they are in immediate contact along the line 27 but there is a space between the flanges 28 and 68 inwardly of that line to receive an antisqueak insert 88, preferably formed from a vinyl plastic and having an enlarged head 89 compressed between the inner edge of the flange 68 and the angle formed between the flange 28 and the panel 29. The antisqueak insert is not visible from the exterior of the body, but provides an effective waterproof joint between the fender and the quarter panel. Figures 4 and 5 also show the cage nuts 91 mounted on the flanges 28 or 68 by cages 92 having tabs 96 spot welded to the respective flanges and down turned ears 97, limiting transverse or rotational movement of the nut, but permitting sufficient longitudinal movement to bring the nut 91 into co-operating engagement with the bolt 90 extending through the holes 80 and 98 in the fender flange 68 and the quarter panel flange 28.

The lower flange 69 from the forward edge of the fender back to the wheel access opening may be similarly attached to the lower surface of the sill 54 (see Section C, Figure 1). The parallel edge flange 72, on the other hand, has slots 93; and, in the preferred form of construction, a T head bolt with the head disposed between the flange 72 and the panel and the shank traversing the slot 93 and the corresponding openings 94 in the surface 37 and accessible from the interior of the luggage compartment for the application of a nut is used to secure the rear part of the fender to the quarter panel. Finally, the extreme rear end of the fender is secured to the quarter panel by a bolt extending through flange 74 and secured to the overhang 62 of the quarter panel. A gusset plate 101 is secured to the vertical panel just forwardly of the wheel access opening 31 and has an outer flange 102 conforming to the curvature of the fender 21 and faced with felt or similar insulating material.

This gusset prevents road material, snow or ice from being thrown forwardly into the enclosure between the fender 21 and the panel 29 and also supports the fender without requiring direct attaching means.

The stone guard 24 is secured at each side to the corresponding rear end of a fender 21 and is bolted along its forward edge to the transverse rear member 63 (Section F, Figures 1 and 6) as by the bolts 95. The co-operating holes in the transverse member 63 and the stone guard 24 are elongated to provide longitudinal adjustment, so that the stone guard 24 may move rearwardly or forwardly with respect to the transverse member 63 as may be required when the front end of the fender 21 is aligned with the door opening. It will be noted that the stone guard 24 is slightly curved longitudinally of the vehicle as at 100, so that if the bumper 25 is struck with sufficient force to impinge upon the stone guard, the guard itself will be bent and will crumple rather than transfer the impact to the transverse member to deform it. This is desirable since damage to the transverse member makes it difficult to close the door and presents a considerably greater repair problem.

Figure 6:
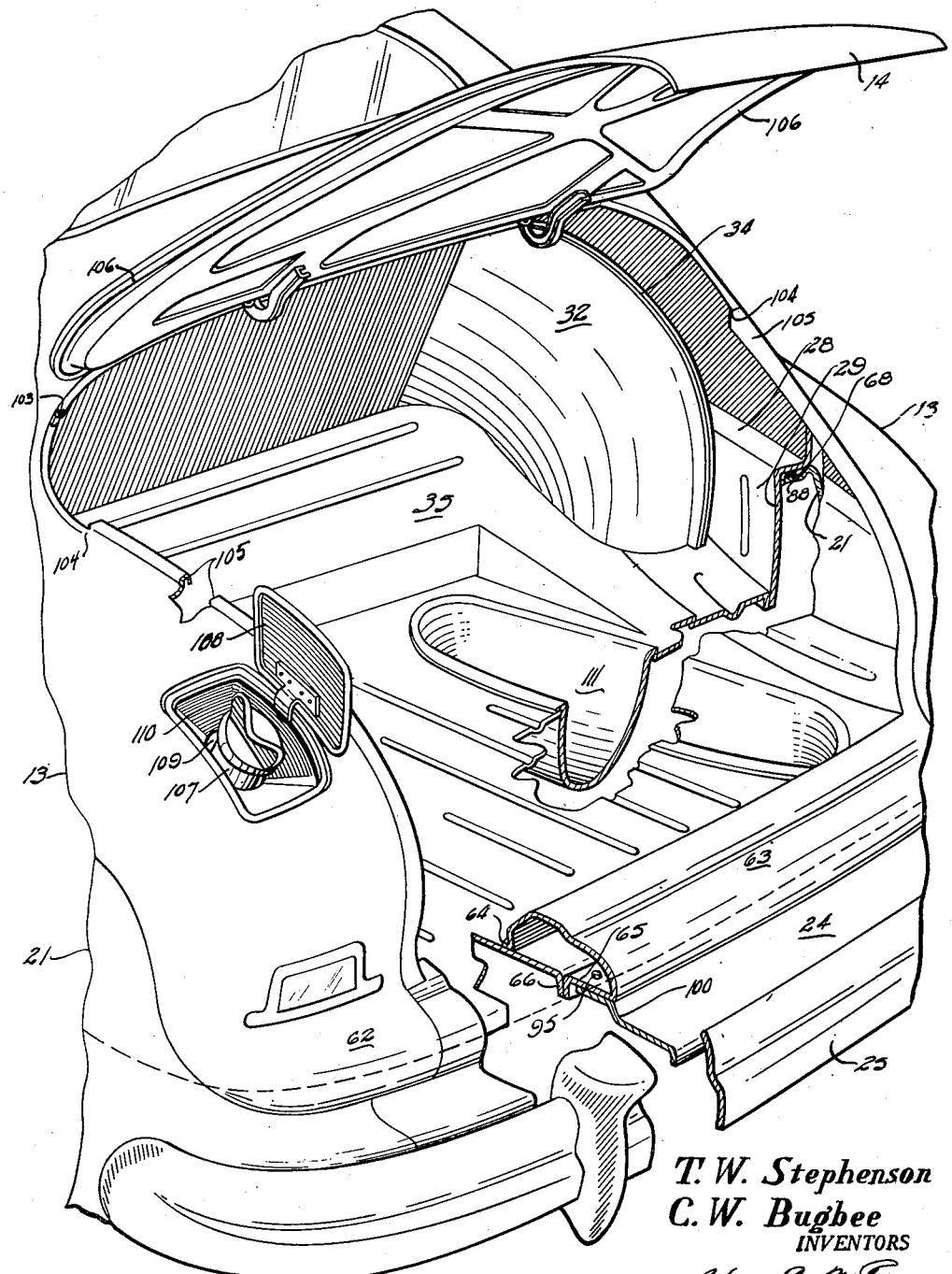
Figure 6 is a perspective view of the baggage compartment of the vehicle with the rear deck door open and including sectional views thereon.

Further details of the construction and its relationship to the interior of the vehicle are shown in Figure 6. The increased luggage space is at once apparent, due to the much smaller space required for the wheelhousing as compared to that necessary when the body panel forms one wall of the housing as is the usual practice. It will be noted that the spare tire well 111 is disposed at an angle to the longitudinal axis of the vehicle, so that the tire may be tilted into the space between the wheelhousing and the rear of the quarter panel and with its top under the overhang of that panel, presenting minimum diminution of the storage capacity. The upper edge of the deck door opening is formed with a concave channel 103 (note broken section in Figure 6) which runs out at point 104. Thereafter, the edge is formed with a convex channel 105 (note broken section in Figure 6) which extends to the transverse member 63. Thus, the water running rearwardly from the top of the vehicle is caught by the channel 103 and discharged to the side of the deck door opening while the channel 105 serves as an abutment, preventing the entry of moisture from the side. The latter channel which is overlapped by the side edge 106 of the deck door also serves to center the door in position and prevents excessive vibration. The conventional gasoline tank is mounted below the floor 35 and fuel is admitted to it through the pipe 107 whose upper end is normally concealed by the filler door 108. It will be apparent that the pipe 107 must traverse the luggage compartment to reach the tank beneath the floor and to prevent leakage to the interior of the compartment, the pipe 107 should be surrounded by a concentric pipe 109 secured to the recess stamping 110 at its upper end and discharging through the floor 35. Thus, any gasoline introduced into the recess 110 will not reach the luggage compartment but will be wasted to the road surface.

The advantage of the foregoing construction is believed to be obvious. It is possible to obtain an extremely neat appearance of the vehicle without the use of panels of exceptional size. In addition, the fender portion which is the most susceptible to damage is easily removable for repair or replacement. Considerable latitude of adjustment is afforded and since the fender and stone guard are assembled as a unit, it is possible to effect this adjustment without adversely changing the decorative line of the vehicle. The joint between the fender and the body is kept at a minimum and appears throughout to be a metal-to-metal joint, although provision may be made for the incorporation of antisqueak and waterproofing material where most necessary. The fender is supported forwardly of the wheel, in effect, as an integral part of the body and adequate structural reinforcing is provided through its free extent to avoid excessive vibration. The provision of a separate wheelhousing prevents the deformation of the exterior fender by road material thrown up by the wheel and permits the use of thinner gauge metal. The fender is readily removable although the means by which it is secured are fully concealed. Although draw is held to a minimum, parts may be so designed as to provide smoothly curved surfaces and a streamline effect unmarred by vertical joints rearwardly of the rear edge of the door.

It is realized that certain changes may be made in the specific constructions here shown and it is the intention to cover by the following claims such of these changes as are within the reasonable scope thereof.

The invention claimed is:

1. In a vehicle body construction having a quarter side panel and a door opening and a floor pan structure, said side panel having its forward edge defining a part of the rear edge of the body door opening and permanently secured along its lower edge to said floor pan structure, an arched wheelhouse located inwardly of said side panel and extending above said floor pan structure, said wheelhouse having its outer arched side secured to a said side panel, a longitudinally extending fender having its forward edge defining another part of the rear edge of said door opening and having its upper edge removably secured to said side panel, wheel access openings in said side panel and said fender transversely aligned with said wheelhousing, the upper edge of the wheel access opening in said side panel being substantially lower than the arch of said wheelhousing and the upper edge of said access opening in said fender being substantially lower than the upper edge of said access opening in said body panel.

2. In a vehicle body construction having opposite substantially vertical side panels and opposite door openings therein and a substantially horizontal floor pan structure extending between and secured at its side edges to said side panels, said side panels having their respective forward edges defining a part of the rear edge of said respective door opening, a rear body member extending transversely between the rear ends of said body panels, longitudinally extending fenders on each side having their forward edges defining another part of the rear edge of said body door opening and having their upper edges removably secured to the respective side panel a substantial distance above said floor pan structure, the rear ends of said fenders extending around behind the respective rear end of said body panels, and a transversely extending stone guard secured at each end to the end of the corresponding fender and having its forward edge secured to said rear body member, said fenders and associated stone guard being arranged for limited movement as a unit longitudinally with respect to said side panels and said rear member to permit alignment of the forward edges of said fenders with forward edge of the corresponding side panel.

3. A fender for automotive vehicles comprising, an elongated substantially flat metal stamping having a longitudinally extending upper edge substantially straight throughout the major part of its extent from one end thereof and curving through the remainder of such extent, an inwardly extending substantially normal flange formed along said straight extent and an inwardly extending return bent flange along the margin of said curved extent, said return bent flange having its face substantially normal to said first flange and generally parallel to said stamping adjacent said curved extent, an inwardly extending angular flange along said one end, and an inwardly extending normal flange along at least a part of the lower edge thereof.

4. In a vehicle body construction, a pair of transversely spaced longitudinally extending body sills terminating rearwardly at each side at a rear wheel-receiving space, a floor pan structure extending rearwardly of said wheel-receiving space and supported on opposite edges at said sill members, a side body panel supported at its lower edge at said floor pan, an arched wheelhousing over said wheel-receiving space within said body panel having its outer arched side secured to said body panel and its inner arched side secured to said floor pan, an inwardly extending longitudinally disposed offset intermediate the top and bottom of said panel, a fender panel having inwardly extending flanged along the top and bottom thereof, the top flange of said fender being seated in and removably secured to said offset in said body panel, the bottom flange of said fender panel underlying and removably secured to the lower surface of said sill member forming a closed side body construction forwardly of said wheel-receiving space.

5. The structure of claim 4 which is further characterized in that a vertical pillar extends upwardly from said sill adjacent the forward edge of said body panel, said fender panel having an inwardly extending angular flange overlying and being releasably secured to said pillar throughout the vertical extent of said fender panel.

6. The structure of claim 4 which is further characterized in that said body panel and said fender panel abut externally along said offset and said flange in a metal-to-metal joint, said fender panel being otherwise spaced a substantial distance outwardly from said body panel.

7. A fender for automotive vehicles comprising, an elongated substantially flat metal stamping having a longitudinally extending upper edge substantially straight throughout the major part of its extent from one end thereof and curving through the remainder of such extent, an inwardly extending substantially normal flange formed along said straight extent and an inwardly extending turned over flange having its face substantially normal to said first flange along said curved extent, an inwardly extending angular flange along said one end, and an inwardly extending normal flange along at least a part of the lower edge thereof, said normal flange along the lower edge of said fender being formed with a depending edge for at least a portion of the rear extent of said fender, said depending edge being spaced inwardly a substantial distance from the major plane of said stamping.

THOMAS W. STEPHENSON.
CHARLES W. BUGBEE.

REFERENCES CITED

The following references are of record in the file of this patent:

UNITED STATES PATENTS

| Number | Name | Date |
| --- | --- | --- |
| 1,856,964 | Moorhouse | May 3, 1932 |
| 2,028,945 | Morrison | Jan. 28, 1936 |
| 2,113,075 | Breer et al. | Apr. 5, 1938 |
| 2,115,903 | Breer et al. | May 3, 1938 |
| 2,194,459 | Frank | Mar. 26, 1940 |
| 2,209,285 | Schjolin | July 23, 1940 |
| 2,329,874 | Cadwallader et al. | Sept. 21, 1943 |
| 2,335,058 | Haltenberger | Nov. 23, 1943 |
| 2,040,870 | Ulrich | July 30, 1946 |